(12) United States Patent
Growcock et al.

(10) Patent No.: US 7,296,842 B2
(45) Date of Patent: Nov. 20, 2007

(54) LOCK MECHANISM FOR CONTAINER COVERING APPARATUS

(75) Inventors: Steven Lewis Growcock, Stuart, FL (US); Thomas Johan Ahlstrom, Stuart, FL (US)

(73) Assignee: John Donovan Enterprises, Inc., Stuart, FL (US)

( * ) Notice: Subject to any disclaimer, the term of this patent is extended or adjusted under 35 U.S.C. 154(b) by 6 days.

(21) Appl. No.: 11/149,445

(22) Filed: Jun. 10, 2005

(65) Prior Publication Data

US 2005/0280277 A1 Dec. 22, 2005

Related U.S. Application Data

(60) Provisional application No. 60/578,409, filed on Jun. 10, 2004.

(51) Int. Cl.
*B60P 7/02* (2006.01)

(52) U.S. Cl. .............. 296/100.01; 296/100.04; 296/100.05

(58) Field of Classification Search ........... 296/100.01, 296/100.04, 100.05, 100.16, 100.18
See application file for complete search history.

(56) References Cited

U.S. PATENT DOCUMENTS

| 3,975,047 | A | 8/1976 | McClellan |
|---|---|---|---|
| 3,977,719 | A | 8/1976 | Thurston |
| 4,505,512 | A | 3/1985 | Schmeichel et al. |
| 5,882,062 | A | 3/1999 | Chenowth |
| 6,234,562 | B1 | 5/2001 | Henning |
| 6,338,521 | B1 | 1/2002 | Henning |
| 6,367,862 | B2 | 4/2002 | Henning |
| 2001/0026076 | A1 * | 10/2001 | Henning ............... 296/100.16 |
| 2002/0033615 | A1 | 3/2002 | Henning |

\* cited by examiner

*Primary Examiner*—Lori L. Lyjak
(74) *Attorney, Agent, or Firm*—Banner & Witcoff

(57) ABSTRACT

An apparatus for covering a top of an open container is provided that includes a cover, an arm assembly, and a lock mechanism. The arm assembly can move between a stowed position in which the container top is substantially open to an extended position in which the container top is substantially covered. The lock mechanism can easily and automatically lock the arm assembly in the extended position as part of the container covering operation. The lock mechanism may include a latch and a latch block that cooperate to automatically and mechanically engage and retain a hook mechanism. The lock mechanism may also include an actuator that, when energized, permits the latch to release the hook mechanism.

21 Claims, 8 Drawing Sheets

LOCK MECHANISM FOR CONTAINER COVERING APPARATUS

CROSS-REFERENCE TO RELATED APPLICATIONS

This application is a continuation in part of now abandoned, provisional U.S. patent application No. 60/578,409 filed Jun. 10, 2004 entitled "Locking Down Tarping Mechanism," the contents of which are incorporated herein by reference.

FIELD OF THE INVENTION

This invention relates in general to covers for open topped cargo container and, more specifically, the invention pertains to a mechanism for restraining a flexible cargo cover over the cargo container.

BACKGROUND OF THE INVENTION

Open topped cargo compartments, such as dump trucks, short vehicle trailers, storage bins and the like, are subject to having material stored therein fall or blow out. This can be particularly dangerous while the compartment is being transported. For instance, if portions of the load fall out onto a roadway (e.g., trucks or trailers hauling sand, gravel, dirt or similar materials), traffic accidents can occur, as well as damage to other vehicles and littering of the roadway. Wind effects can intensify the risk of inadvertent material loss. For instance, lightweight materials, such as plant clippings being taken to a landfill, mulch materials, or harvested plants like cotton, are liable to having gusty winds blow portions of the contents out of the vehicle or bin.

In many places, laws and regulations require the tops of such containers to be covered before they can be transported on public roadways to prevent material being blown out of the containers. Even where there are no laws regarding covering a load, it is beneficial for the driver to cover the load to reduce the possibility of damage to other property from escaping materials. Thus, tarpaulins are commonly used to cover the loads during transport. In addition, tarpaulins are often used to keep environmentally sensitive materials, such as asphalt, wheat, etc. dry and warm or cool during static storage as well as during transport.

Manually placing a tarp or cover on an open-top container is both time-consuming and expensive. As such, automated tarpaulin covering systems are commonly used. FIG. 1 shows a conventional automated tarpaulin covering system 10 for a cargo container 12. The covering system 10 has a tarpaulin 14 connected at one end to a movable cross bar 16. The cross bar joins parallel arms 18 and 20 that are pivotally mounted on opposite sides of the cargo compartment via pivot 22. The parallel arms are spring biased rearward toward a covered position. The tarpaulin 14 is rolled on a roller bar 24, from which it extends to connect with cross bar 16. Roller bar 24 is mounted at the top of the cab shield 26 of the container. Roller bar 24 is driven via electric, hydraulic or manual mechanisms to roll and unroll the tarpaulin 14. Due to their rearward spring bias, the parallel arms pull the tarpaulin toward the rear of the truck as it is unrolled, which covers the opening on top of the container.

The spring-driven force applied to the tarpaulin via parallel arms 18 and 20 decreases as the parallel arms rotate rearward to the covered position, because of the nature of the spring biasing that drives the parallel arms. The reduced spring force applied at the end of the tarp-covering stroke results in the parallel arms having reduced force to maintain tension in the tarpaulin in the covered position. Thus, the tension applied to the tarpaulin in conventional systems is often ineffective for counteracting movement of the stored materials against the inside of the tarpaulin, wind gusts applied to the tarpaulin, or other forces applied during static storage conditions.

During transport of the container, the low tension applied to the tarpaulin is further exploited by higher wind shear and aeronautic effects. When traveling, trucks hauling these containers create turbulent airflow at their headend that undulates the tarpaulin as the turbulent air passes over it. In addition, low pressure on the open side of the container creates lift on the tarpaulin, which acts like an airfoil. The turbulent air and low pressure periodically lift the tarpaulin upwards when the vehicle is in motion. The reduced spring tension coupled with the undulating, upward motion of the tarpaulin often permits the tarpaulin to expose partially the open top container and, in some extreme cases, can catastrophically damage the arms, tarpaulin and other components of the automated tarpaulin system.

Manual and automatic hold down mechanisms are known that attempt to improve tension in the tarpaulin while in the closed configuration. The conventional automated systems rely upon complicated arrays of mechanical, electrical or hydraulic structures to apply a constant tension along the length of the tarp. In addition, the conventional systems typically must be activated by the user as a separate step subsequent to covering the container. Further, the conventional systems often require activation energy, such as electrical and hydraulic inputs, beyond movement used to move the cover.

The most common conventional system is a manual tie down system of cords attached to either the tarpaulin or the parallel arm structure of the automated tarpaulin system to improve tension in the tarpaulin and its retention of material within the container. The manual tie down system requires the vehicle operator to climb to the open top container and secure the cords after the cargo is loaded and the automated tarpaulin system has deployed. It also requires undoing the cords just before the tarpaulin is uncovered prior to unloading the cargo. This is very time consuming and potentially a hazardous process for the vehicle operator.

Another conventional hold down mechanism is shown in U.S. Pat. No. 6,234,562 issued May 22, 2001 to Henning (Henning), which discloses a lock mechanism that relies upon wind energy to activate it. The lock mechanism includes a pivotally mounted wind vane that rotates in response to sufficient air pressure being applied against the vane to activate the mechanism, such as would be provided at a certain rate of travel on a roadway. In addition, Henning teaches that the lock mechanism can be deployed by a human via activation of a cable system or of a mechanical linkage system using an electrically or hydraulically driven actuator. Thus, the Henning system requires sufficient air pressure to deploy the lock mechanism or it requires the user to activate another system to deploy it.

SUMMARY OF THE INVENTION

The principles of the present invention may be used advantageously to provide a lock mechanism and a container covering apparatus having a lock mechanism that can easily and automatically lock the covering apparatus as part of the container covering operation. In accordance with an aspect of the invention, an apparatus for covering an open container of a vehicle includes a cover movable between an extended position in which the cover overlies the container and a stowed position in which the container is open, an arm assembly coupled to the cover to move the cover between the extended and the stowed positions, and a lock mechanism that automatically locks the arm assembly in the extended position when the arm assembly moves to the extended position.

In accordance with another aspect of the invention, a lock mechanism for automatically locking a container covering apparatus in an extended position includes a latch and a latch block that cooperate to automatically, mechanically engage and retain a hook mechanism. In accordance with another aspect, a method for covering an open top container supported by a vehicle includes the steps of providing a cover attached to a pivoted arm structure, actuating a first actuator to drive the pivoted arm structure to an extended position, and, in response to the pivoted arm structure substantially reaching the extended position, automatically locking the pivoted arm in the extended position. These and additional features and advantages of the invention disclosed here will be further understood from the following detailed disclosure of certain embodiments.

DETAILED DESCRIPTION

Figure 1:
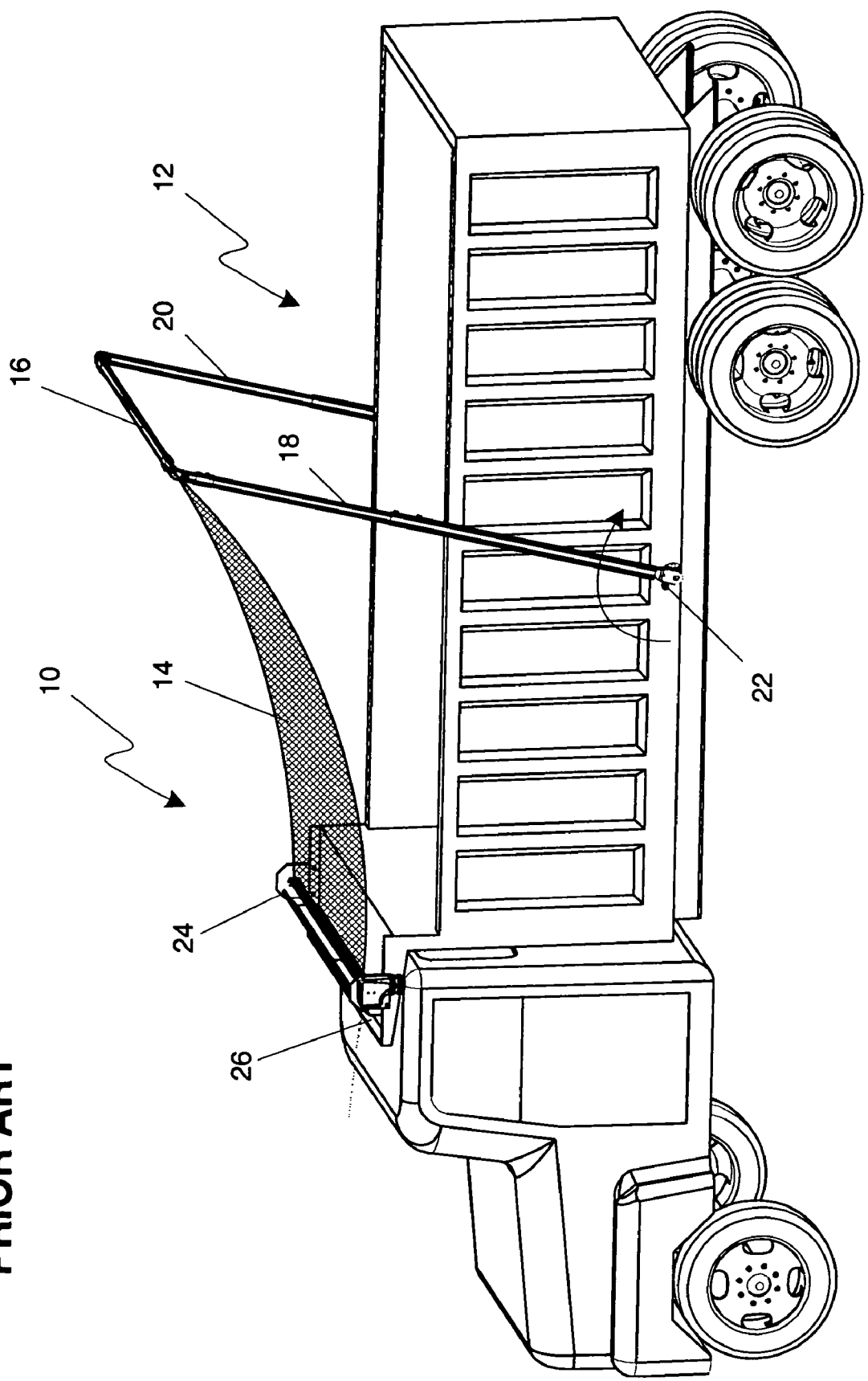
FIG. 1 is top perspective view of a vehicle with an open top container that is equipped with a conventional automated covering system.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

FIGS. 2-8 show a truck 110, or other vehicle, for use with illustrating various aspects of the invention that may be combined into a variety of embodiments of the invention. As shown, truck 110 has a container 112 thereon with an opening 114 at its top and a container covering apparatus 116 for covering the top. The container covering apparatus 116 includes a lock mechanism 118 that can lock the container covering apparatus in an extended position in which a flexible cover 120 at least partially covers opening 114. The lock mechanism provides a restraining force against the flexible cover to counteract the effects of wind passing over the cover. While the illustrated embodiments are particularly adapted for use with hauling vehicles, the same principals can be applied to stationary open-topped containers utilizing flexible covers. In addition, the illustrated embodiments more specifically pertain to a dump truck hauling vehicle 110. Nevertheless, the same principals can be applied to a variety of hauling vehicles having open-topped containers.

As shown, covering apparatus 116 has a pair of arms 122 and 124 separated by a preselected lateral distance. Arms 122 and 124 are separated by a distance sufficient to clear container 112 as the arms move along their path of travel between front and rear portions of the container. Each arm 122, 124 is rotatably mounted at a first end portion thereof to the container via a hinge mechanism 126. In other embodiments, arms 122 and 124 may be mounted to the truck rather than to the container. As with the system of FIG. 1, arms 122 and 124 are biased to rotate rearward about hinge mechanisms 126. However, in other embodiments, arms 122 and 124 may also be driven rearward, such as via electrical or hydraulic drive mechanisms. In the spring biased configuration, hinge mechanisms 126 may include torsion springs (not shown) to bias the arms rearward. Other bias mechanisms may include a counter arm (not shown) coupled to the hinge mechanisms and loaded with a spring force in the rearward direction of rotation of the arms, or other rotational biasing mechanisms.

A cross bar 128 extends between arms 122 and 124 at second end portions thereof opposite their first end portions. The cross bar is attached to a first end portion 130 of flexible cover 120. Flexible cover 120 extends from the cross bar to a roller bar 132 mounted at the top of the cab shield 134 of the container. As with the prior art system of FIG. 1, roller bar 132 may be driven via electric, hydraulic or manual mechanisms to roll and unroll flexible cover 120 thereon. Due to the rearward biasing of the parallel arms, the parallel arms pull the cover toward the rear of the truck as it is unrolled to cover opening 114.

Arms 122 and 124 and roller bar 134 may be tubular members; although, other configurations may be used. Cover 120 is wound about roller bar 132, which includes a rod extending through a spool 136 on which the cover is rolled and support brackets attached to the rod. In other embodiments, a spool could be rotatably secured to truck 110 with the cover being pulled from the spool as it is deployed over container 112, similar to the action of a window shade being pulled into its deployed condition. In further embodiments, a spool holding the rolled-up cover could be disposed on cross bar 128 and an end portion of the cover could be attached to roller bar 132 such that the remainder of the rolled-up cover would move as the arms move from a stowed position to an extended position.

Cover 120 may be formed of a flexible material such as polyester, polypropylene, vinyl, canvas, or another material suitable for retaining material within a container. Other suitable materials for cover 120 will become readily apparent to those skilled in the art, given the benefit of this disclosure. Spool 136 may also be spring loaded to cooperate with arms 122 and 124 to maintain the cover in tension while in the extended position.

In order to activate the automatic covering apparatus 116, the operator initially actuates a release (not shown) to allow spool 136 to unroll the cover which permit arms 122 and 124 to rotate from a foreword position proximate roller bar 132 to a rearward position in which container opening 114 is substantially covered. The release may include a lock on spring-loaded spool 136 that prevents the spool from unwinding. In other configurations, the release may be mechanical, electrical and/or hydraulic controls for the roller bar 132 that control the rolling and unrolling of the cover via a powered spool. It could also be a mechanical, electrical and/or hydraulic release of a mechanism holding the arms in a stowed configuration. Further, the release could be a manual release of a retention mechanism (not shown) that holds arms 122 and 124 in the stowed configuration against the spring bias at hinge members 126. The retention mechanism may simply be a hook or other type of latch that holds arms toward the forward portion of the container. Nonetheless, for the configuration shown and these alternatives, the operator can start the process of covering opening 114 by permitting the arms 122 and 124 to rotate in direction 141 from a stowed configuration to an extended configuration to cover opening 114. Depending upon the particular configuration, the arms may have various extended and stowed configurations to accommodate different size containers and covering configurations. For example, the arms may be attached to the truck rather than to the container and they may be able to rotate in various arc sizes to accommodate larger or smaller containers.

Figure 2:
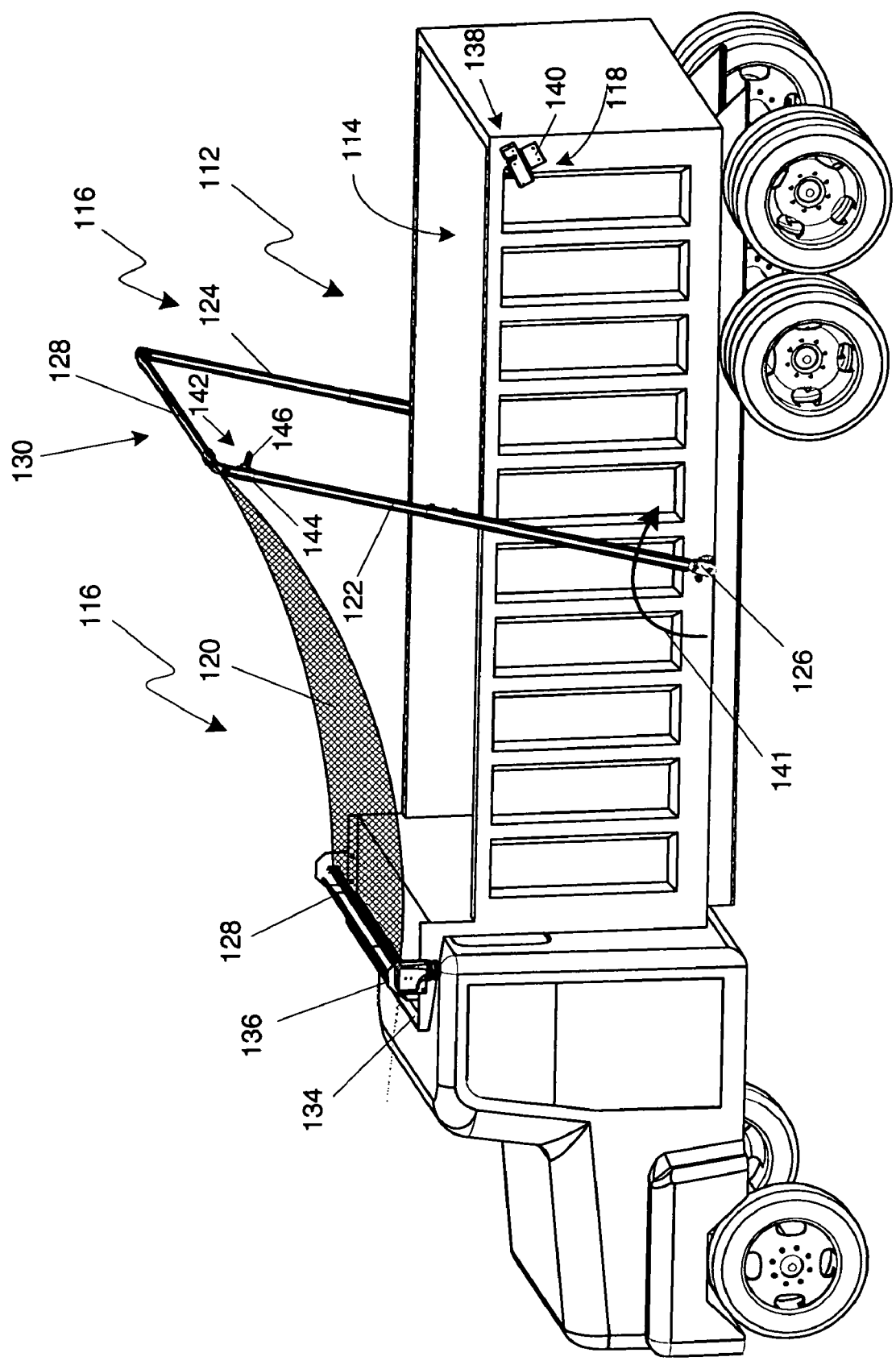
FIG. 2 is a top perspective view of a vehicle with an open top container that is equipped with an automated covering system and a lock mechanism according to embodiments of the present invention.

For the configuration illustrated in FIG. 2, once the operator activates covering apparatus 116 to cover opening 114, the system automatically proceeds to rotate arms 122 and 124 to an extended configuration in which a hook assembly 142 of the lock assembly engages an actuator assembly 138 of the lock assembly. Upon engagement, the lock assembly automatically locks the arms in the extended configuration. In other words, the operator can simply activate the covering apparatus 116 to move the cover to an extended position, and that action can automatically result in the covering apparatus being locked by the lock mechanism 118 in the extended position without the operator needing to take further steps, such as a separate step to actuate the lock mechanism 118.

As shown in FIG. 2, lock mechanism 118 generally includes an actuator assembly 138 attached to a side of container 112 via an installation bracket 140 and a hook assembly 142. Hook assembly 142 is mounted on parallel arm 122 and fixed in a desired position along the arm with a bolt, pin or other mechanical mechanism. As discussed later, hook assembly 142 is preferably slidably mounted on arm 122, which permits it to be adjusted for different extended positions (e.g., less than fully covering the container) or, if the arms are attached to the truck for different container sizes. The hook assembly 142 may be formed from a tube slider 144 having a slightly larger internal shape than the exterior of parallel arm 122. A hook 146 is attached to the slider, which may be formed from a generally U-shaped bolt 146. A lower portion of U bolt 146 engages actuator assembly 138 to lock the automated covering apparatus 116 in an extended position.

Figure 3:
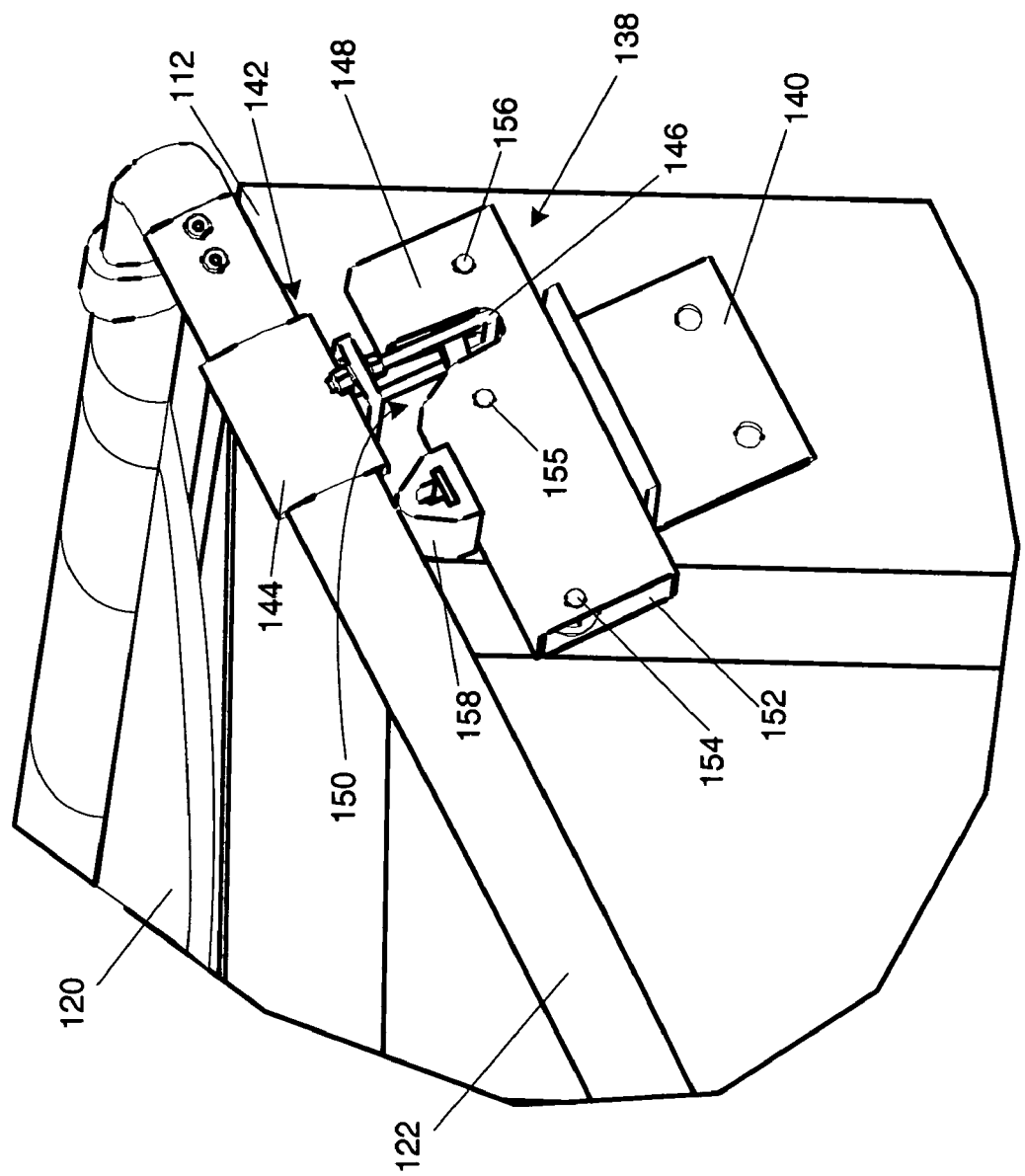
FIG. 3 is a perspective view of the lock mechanism of FIG. 2 shown in a locked configuration when the covering system is in an extended position.

Referring now to FIG. 3, actuator assembly 138 and components of the hook assembly 142 are shown in the locked configuration when the covering apparatus is in an extended position. As shown, actuator assembly 138 has a housing 148 that may be fabricated out of rectangular shaped metallic tube. The housing 148 has a notch 150 that receives U bolt 146, which may generally be V-shaped. The housing also includes holes through its side walls to accommodate bearing pins 154, 155 and 156 extending therethrough. A rubber bumper 158 is attached to the top side of the assembly to provide a cushion between the parallel arm 122 and the actuator assembly while in the latched configuration. The actuator assembly 138 may be attached to the side of container 112 by means of an installation bracket 140, which could be mechanically fastened or welded in place.

Figure 4:
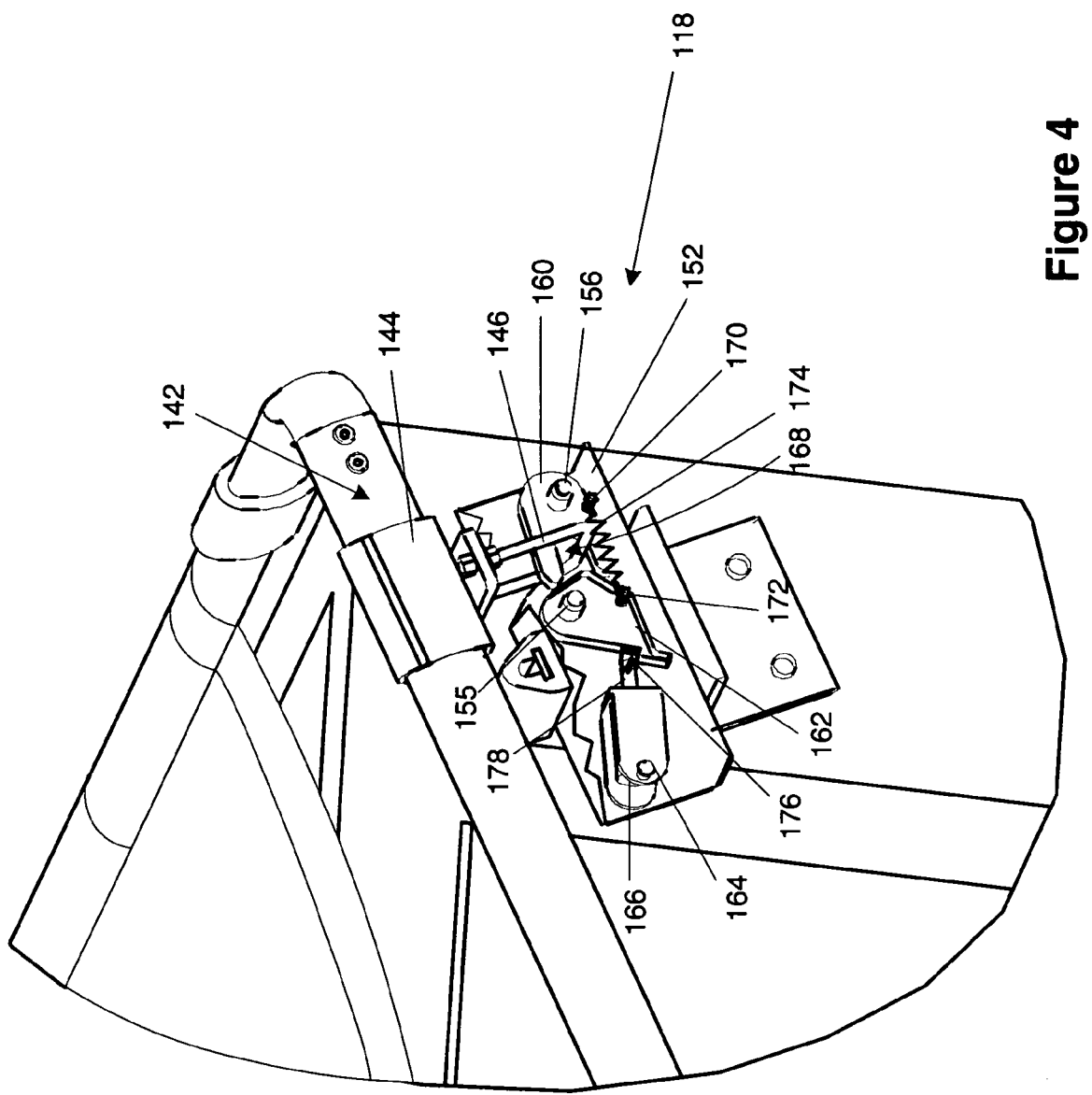
FIG. 4 is a perspective view of the lock mechanism of FIG. 3 shown with the mechanism housing removed while the lock mechanism is in the locked configuration.
Figure 5:
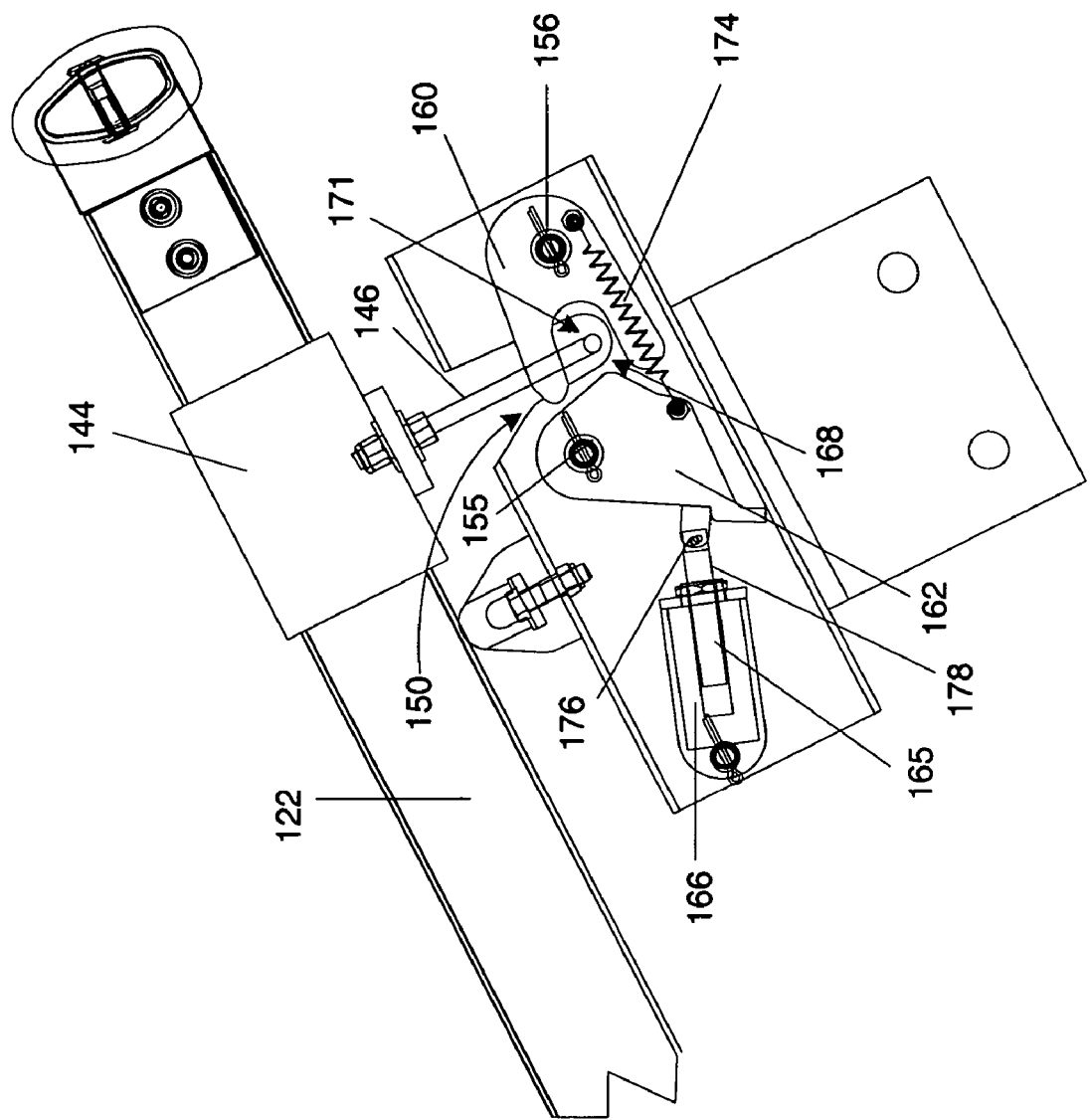
FIG. 5 is a side view of the lock mechanism of FIG. 4.
Figure 6:
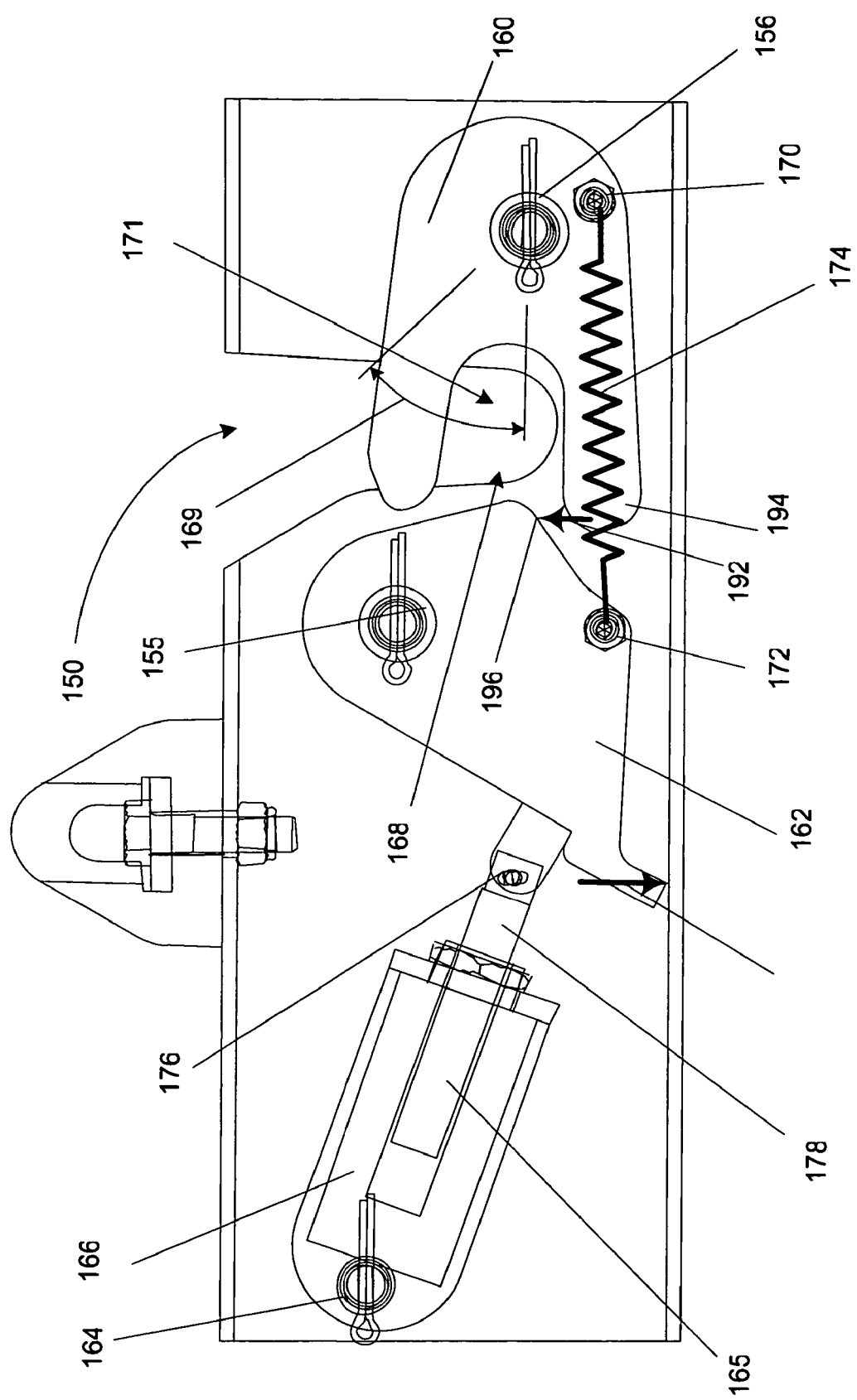
FIG. 6 is a side, close view of portions of the lock assembly of the lock mechanism of FIG. 4.

FIGS. 4-6 illustrate the internal components of the actuator assembly in the locked configuration with part of the housing removed to expose the internal components. Actuator assembly 138 generally consists of a housing 148 (see FIG. 3), a latch 160 and corresponding pin 156, a latch block 162 and corresponding pin 155, an actuator mount 166 and corresponding pin 164, an actuator 165 and corresponding pin 164, and a flexible linkage 174 and its attachment pins 170 and 172. The latch 160 is generally crescent-shaped to form a concave opening 168 that may generally be V shaped. Latch 160 is pivotally mounted on its pin and can rotate to move V shaped opening 168 between a lock position, which may be substantially horizontal relative to a bottom wall 152 of the housing, to an open position upward from the bottom wall. The angle of rotation 169 between the lock position and the open position may be between about 30 and 120 degrees, and is preferably about 30-50 degrees. While V shaped notch 168 is in the lock position, U bolt 146 is retained within an intersection 171 between V shaped opening 168 and V notch 150 of the housing. The intersection of these two notches results in an end portion of the U bolt being enclosed within and securely retained by the actuator assembly 138. When the V shaped notch 168 is permitted to rotate upward to the open position shown in FIG. 7, U bolt 146 is free to exit both V shaped notch 168 of the latch and V notch 150 of the housing.

Lock mechanism 118 can mechanically retain U bolt 146 in the locked configuration as a default state without receiving user input or without being activated manually, pneumatically, hydraulically or electrically. When an end portion of U bolt 146 is enclosed within intersection 171, mechanical interactions between latch 160, latch block 162, and bottom wall 152 of the housing cooperate to maintain latch mechanism in the locked configuration. As shown in FIG. 6, upward rotation of latch 160 in the direction 192 will cause a bottom prong 194 of the latch to make contact with a shoulder 196 of the latch block. This contact will apply upward force to shoulder 196, which will cause it to rotate counterclockwise about pin 155 to drive foot 198 into bottom wall 152 of the housing and thereby halt rotation of the latch block. As such, the end portion of U bolt 146 remains trapped within the intersection 171 of V notches 150 and 168. Of course, downward rotation of latch 160 will drive bottom prong 194 into bottom wall 152 to limit movement of the U bolt in the opposite direction.

Figure 7:
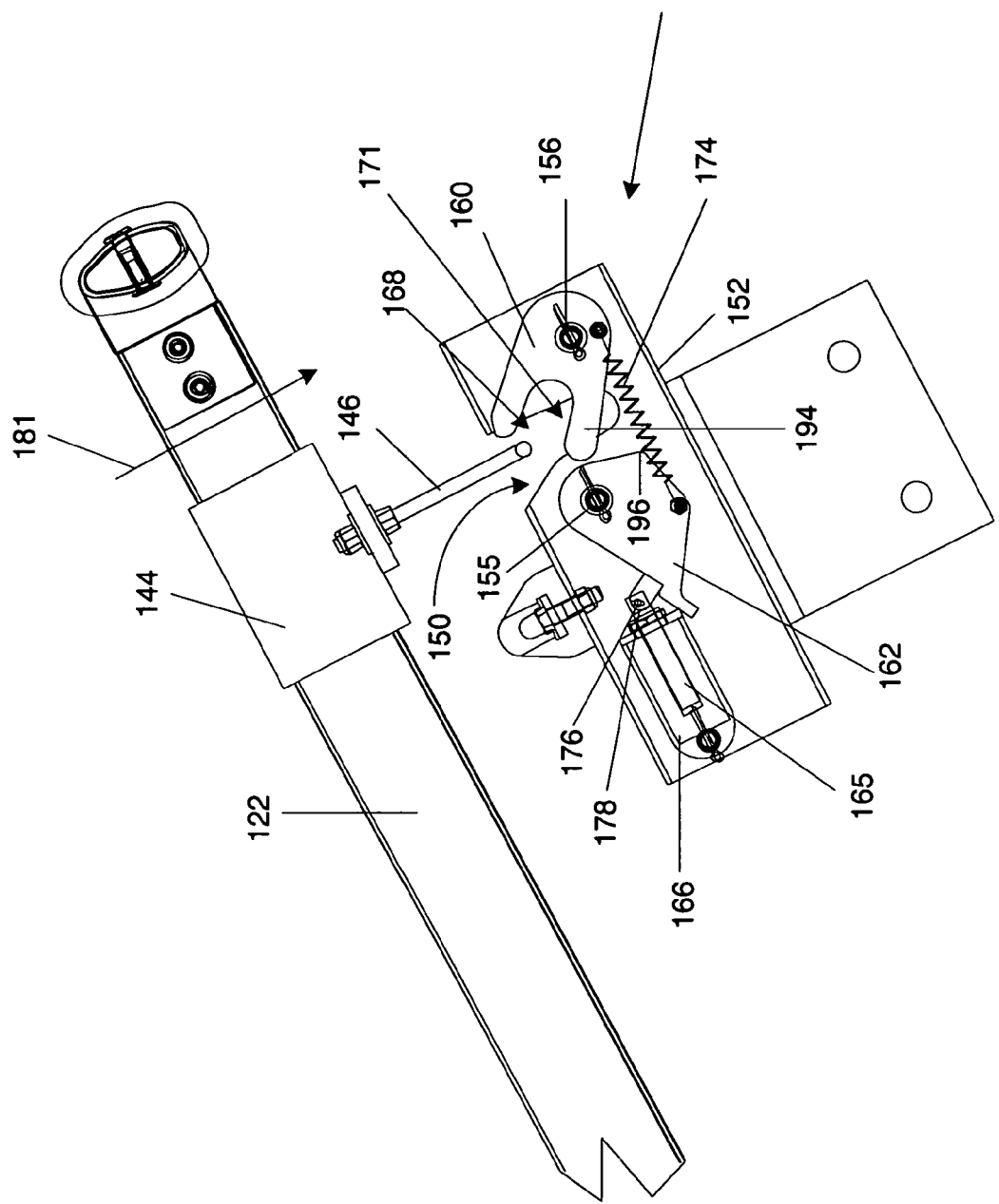
FIG. 7 is a side view of the lock mechanism of FIG. 4 shown in an unlocked configuration.
Figure 8:
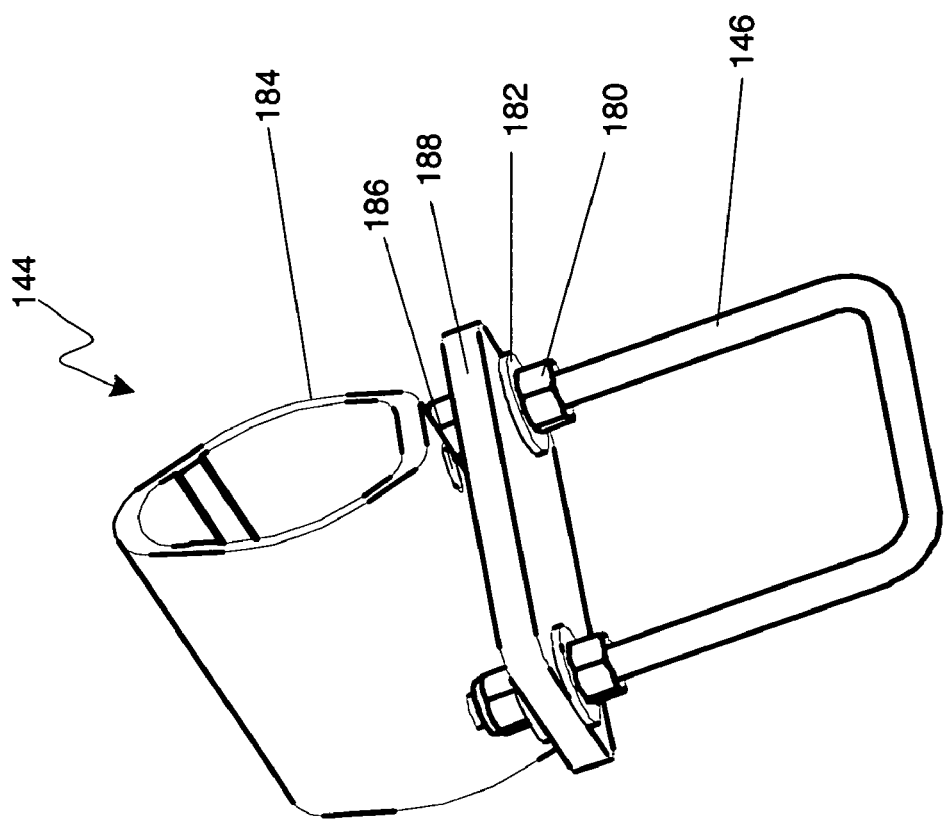
FIG. 8 is perspective view of the hook assembly of FIG. 1.

In addition, lock mechanism 118 can operate in a mechanical manner to automatically engage and retain U bolt 146 in the locked configuration without requiring the user to take additional steps and without the lock mechanism being activated manually, pneumatically, hydraulically or electrically. As shown in FIG. 7, in the unlocked configuration, V shaped opening 168 is angled upward to provide an entrance into intersection 171 through V notch 150. As arm 122 rotates rearward, U bolt 146 moves in direction 181 into intersection 171. As the U bolt engages bottom prong 194 and drives it downward, latch 160 rotates counterclockwise and pulls on linkage 174. Linkage 174 connects a bottom portion of latch 160 to a bottom portion of latch block 162. As such, counterclockwise rotation of latch 160 likewise causes latch block 162 to rotate counterclockwise about its pin 155. In the absence of the actuator 165 being activated, latch block 162 is free to rotate with linkage 174 and to move into the latch position shown in FIGS. 4-6.

Linkage 174 is preferably formed from one or more flexible linkages, such as a spring, that applies a tensile force along its length when stretched. A flexible linkage permits lock mechanism to release arm 122 without forcing it to move foreword out of intersection 171 until desired. Preferably, an extension type helical spring is used for linkage 174, which can provide good biasing force in an opposite direction when stretched without applying excessive force when stretched. In order to release U bolt 146, actuator 165 pulls on a bottom portion of latch block 162 to bias it forward rotation in a clockwise direction. As shown in FIG. 6, clockwise rotation of latch block 162 from its locked configuration will move shoulder 196 out of interfering contact with bottom prong 194 of latch 160. Thus, latch 160 is free to rotate clockwise and thereby free the end portion of U bolt 146 whenever arm 122 rotates foreword. Use of a flexible linkage 174, rather than a rigid linkage, permits U bolt 146 to be released without prematurely forcing the U bolt out of the intersection 171. Due to the flexible linkage 174 between the latch 160 and latch block 162, their rotational movement is coordinated. Indeed, latch block 162 encourages latch 160 to rotate via flexible linkage 174 for releasing the U bolt and, similarly, latch 160 encourages latch block 162 to rotate into the locked configuration via linkage 174.

The actuator 165 provides a linear force to latch block 162 to cause rapid rotation thereof. The actuator could be energized by manual, pneumatic, hydraulic or electrical energy sources. Actuator 165 is attached to an actuator mount 166 that is pivotally mounted on its pin 164. Preferably, an actuator arm 178 is attached to latch block 162 by means of a pin 176 to form a rotatable joint. The actuator arm 178 retracts when the actuator 165 is energized and it is free to slide between extended and contracted positions when there is no excitation energy on it.

Referring now to FIG. 7, a close view of hook assembly 144 is provided. Hook assembly 144 may be slidable with respect to parallel arm 122 to permit adjustability for locking the cover in various extension positions, such as to cover partially a load or to accommodate various container sizes for configurations in which the parallel arms are mounted to the truck and the container is removable. In general, hook assembly includes a jacket 184 that fits over parallel arm 122 and/or parallel arm 124, a U bolt bracket 188, a U bolt 146, nuts 180 and washer 182 to attach the U bolt 146 on the U bolts bracket 188. The U bolt bracket 188 is firmly attached to the jacket 184 via weldments or other mechanical mechanisms. The internal shape of the jacket 184 is slightly larger than the outer shape of the parallel arms 122 and 124, which permits the hook assembly 144 to slide over the parallel arms. The hook assembly 144 can be fixed in a position along one of the parallel arms or crossbar 128 via a bolt or pin through the threaded or straight hole 186 on jacket 184.

While the invention has been described with respect to specific examples including presently preferred modes of carrying out the invention, those skilled in the art will appreciate that there are numerous variations and permutations of the above-described systems and techniques that fall within the spirit and scope of the invention as set forth in the appended claims. In particular, many variations and permutations may be possible for the lock mechanism that fall within the scope of the present invention. In addition, the present invention may be applicable to a wide variety of automatic and manual cover systems. Further, although only one lock mechanism is shown in the drawings, lock mechanisms may exist on both sides of the container at an open portion of the container, and multiple mechanisms may be on one or both sides of the container to enhance latching effectiveness and/or to provide a variety of options and configurations.

What is claimed is:

1. An automated apparatus for covering a top of an open top container, the apparatus comprising:
   a flexible cover movable between an extended position in which the cover overlies the container top and a stowed position in which the container top is substantially open;
   an arm assembly coupled to the cover to move the cover between the extended and the stowed positions; and
   a lock mechanism coupled to the arm assembly to automatically lock the arm assembly in the extended position in response to the arm assembly substantially reaching the extended position while moving from the stowed position to the extended position.

2. The apparatus of claim 1, wherein the lock mechanism includes a release for releasing the lock mechanism from the locked position and the lock mechanism retains the arm assembly in the extended position until the release is actuated.

3. An automated apparatus for covering a top of an open top container, the apparatus comprising:
   a flexible cover movable between an extended position in which the cover overlies the container top and a stowed position in which the container top is substantially open;
   an arm assembly coupled to the cover to move the cover between the extended and the stowed positions; and
   a lock mechanism coupled to the arm assembly to automatically lock the arm assembly in the extended position in response to the arm assembly moving from the stowed position to the extended position;
   wherein the lock mechanism includes a release for releasing the lock mechanism from the locked position and the lock mechanism retains the arm assembly in the extended position until the release is actuated and the release includes a powered actuator.

4. The apparatus of claim 3, wherein the powered actuator is driven by one of electrical, pneumatic and hydraulic inputs.

5. An automated apparatus for covering a top of an open top container, the apparatus comprising:
   a flexible cover movable between an extended position in which the cover overlies the container top and a stowed position in which the container top is substantially open;
   an arm assembly coupled to the cover to move the cover between the extended and the stowed positions; and
   a lock mechanism coupled to the arm assembly to automatically lock the arm assembly in the extended position in response to the arm assembly moving from the stowed position to the extended position;
   wherein the lock mechanism includes a release for releasing the lock mechanism from the locked position and the lock mechanism retains the arm assembly in the extended position until the release is actuated and the release includes a manual actuator.

6. The apparatus of claim 1, wherein the lock mechanism includes a hook assembly mounted on one of the container and the arm assembly and a latch mechanism mounted on the other one of the container and the arm assembly, the hook assembly engaging the latch mechanism when the arm assembly is in the extended position, engagement of the latch mechanism by the hook assembly causing the lock mechanism to automatically and mechanically lock the arm assembly in the extended position.

7. The apparatus of claim 6, wherein the latch mechanism includes an actuator and the latch mechanism releases the hook assembly from being mechanically locked therewith in response to the actuator being energized.

8. The apparatus of claim 7, wherein the actuator is energized by one of an electrical, hydraulic and pneumatic energy source.

9. The apparatus of claim 6, wherein the actuator is energized by a manual mechanism.

10. The apparatus of claim 7, wherein the latch mechanism comprises a latch and a latch block, the latch retaining the hook assembly in a mechanically locked position and the latch block blocking the latch from moving out of the mechanically locked position when the actuator is not energized.

11. The apparatus of claim 10, wherein the actuator moves the latch block when energized to permit the latch to move from the mechanically locked position.

12. The apparatus of claim 6, wherein the hook assembly is slideably attached to an arm of the arm assembly.

13. The apparatus of claim 6, wherein the latch mechanism includes a housing having a first notch formed therein, the first notch having an opening oriented to receive a hook of the hook assembly and to guide the hook into contact with a latch of the latch mechanism.

14. The apparatus of claim 13, wherein the latch forms a second notch having an opening oriented to receive the hook entering the first notch while in an unlatched position.

15. The apparatus of claim 14, wherein the first notch and the second notch intersect each other to form an enclosed space in a locked position for retaining a portion of the hook therein.

16. The apparatus of claim 6, wherein the lock mechanism further includes a resilient bumper disposed between the hook assembly and the latch mechanism while in a locked configuration.

17. The apparatus of claim 1, wherein the arm assembly comprises:
 a first arm on a first side of the container;
 a second arm on a second side of the container opposite the first side;
 a first pivot on the first side of the container connected to a first end of the first arm;
 a second pivot on the second side of the container connected to a first end of the second arm; and
 a bias mechanism biasing the first and second arms about their respective first and second pivots toward the extended position.

18. A method for covering a container having an open top, the method comprising:
 providing a cover attached between ends of pivoted arm structures, one of the pivoted arm structures being provided to each side of the container;
 driving the pivoted arm structures and the cover from a stowed position in which the top is substantially exposed to an extended position in which the cover substantially covers the top;
 while being driven, when the pivoted arm structures substantially reach the extended position, automatically locking the pivoted arm structures in the extended position.

19. The method of claim 18, wherein the step of automatically locking includes manually locking the pivoted arm structures in the extended position.

20. A method for covering a container having an open top, the method comprising:
 providing a cover attached between ends of pivoted arm structures, one of the pivoted arm structures being provided to each side of the container;
 driving the pivoted arm structures and the cover from a stowed position in which the top is substantially exposed to an extended position in which the cover substantially covers the top;
 when the pivoted arm structures are substantially disposed at the extended position, automatically locking the pivoted arm structures in the extended position;
 wherein the step of automatically locking includes manually locking the pivoted arm structures in the extended position and the step of automatically locking is performed via a lock mechanism, the method further comprising releasing the pivoted arm structures from the extended position in response to receiving activation energy at an actuator of a lock mechanism.

21. An automated apparatus for covering a top of an open top container, the apparatus comprising:
 a flexible cover movable between an extended position in which the cover overlies the container top and a stowed position in which the container top is substantially open;
 an arm assembly coupled to the cover to move the cover between the extended and the stowed positions;
 a bias mechanism biasing the first and second arms about their respective first and second pivots toward the extended position; and
 a lock mechanism coupled to the arm assembly to automatically and mechanically lock the arm assembly in the extended position in response to the arm assembly moving from the stowed position to the extended position, the lock mechanism comprising:
  a hook assembly mounted to one of the container and the arm assembly;
  a latch mechanism mounted on the other one of the container and the arm assembly, the latch mechanism including an actuator, the latch mechanism retaining the hook assembly in a locked position when the arm assembly is in the extended position and releasing the hook assembly from the locked position when the actuator is energized.

* * * * *